Dec. 16, 1958     H. R. BRESLAU     2,864,576
SUPPORTING DEVICE
Filed March 23, 1954
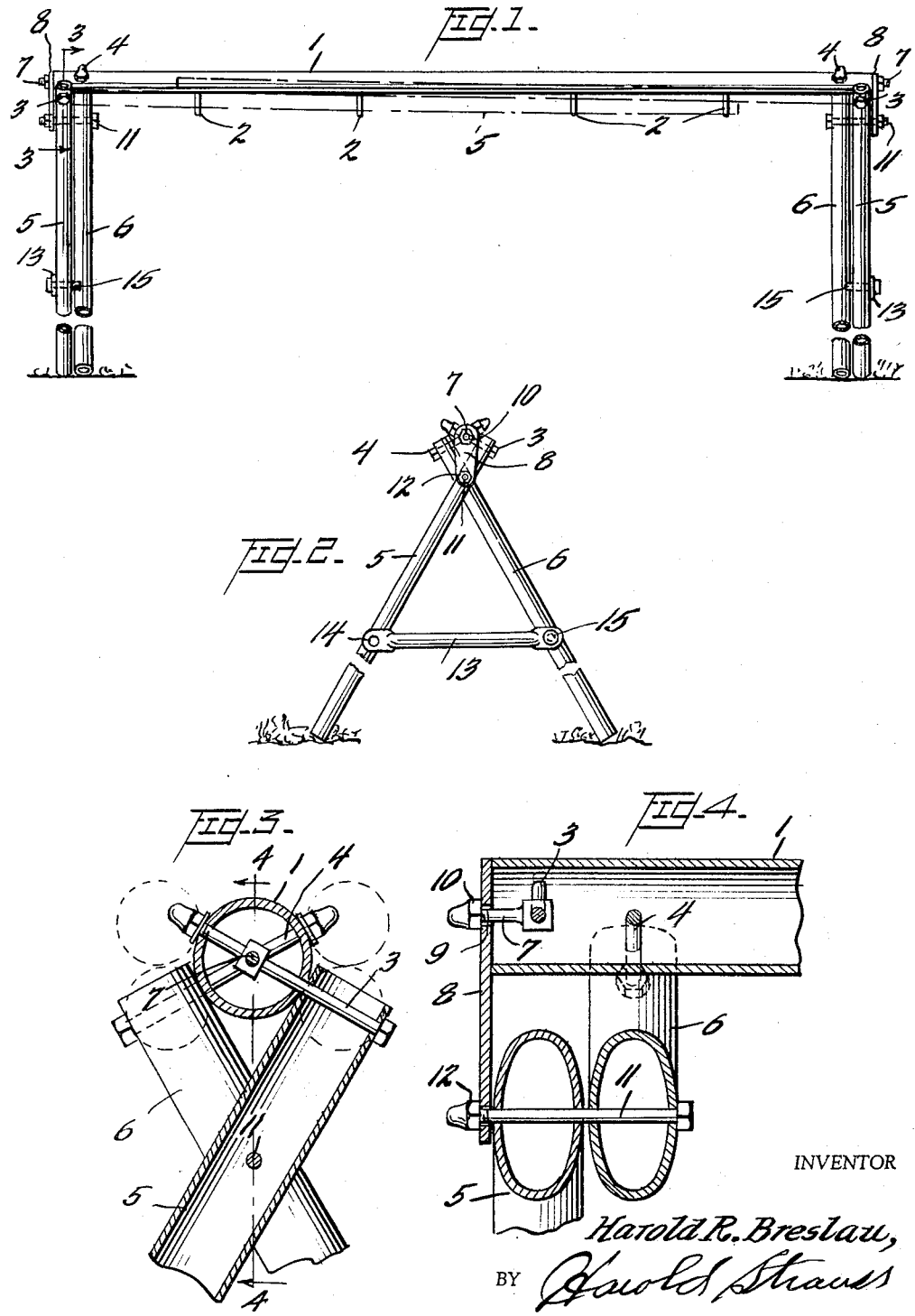
INVENTOR
Harold R. Breslau,
BY Harold Strauss
ATTORNEY United States Patent Office 2,864,576
Patented Dec. 16, 1958

2,864,576

SUPPORTING DEVICE

Harold R. Breslau, Baltimore, Md.

Application March 23, 1954, Serial No. 417,998

3 Claims. (Cl. 248—166)

My invention relates to a supporting device and more particularly to an outdoor gym set, designed to be set up in a yard or playground to support swings, rings or similar exercisers.

It is an object of my invention to provide a device of this character which, when properly erected, is strong and rigid, yet may be quickly and easily taken down for packing or shipping.

It is a further object of my invention to provide a gym set which is quite sturdy, yet can easily be handled by one person for erection or dismantling and requires no tools, except a wrench.

A further object is to provide a device of this character which can be quickly taken down, and folded, in a manner so it can readily be placed in a carton for shipment.

With these and other objects in view the invention comprises certain novel features and arrangement of parts which will be more fully described and pointed out in the appended claims.

In the drawings, forming part of this application,

Figure 1 is a side elevation of an outdoor gym set.
Figure 2 is an end elevation thereof.
Figure 3 is a section on the line 3—3 of Figure 1, and
Figure 4 is a section on the line 4—4 of Figure 3.

For the amusement of small children, devices known as gym sets are set up in yards or playgrounds, and generally comprise a horizontal bar, supported by crossed legs at either end, and having hooks or eyes secured to the bar, to which may be fastened swings, rings or other exercising means. The gym sets now on the market are usually fairly heavy and require the services of two people to handle them. Also, they must be completely dismantled for shipment. My device, while sturdy, can easily be handled by one person, and when in its erected position only requires the removal of two bolts, so the legs can be folded parallel to the bar, and the device is ready for shipment.

As shown in the drawings 1 is a bar, which is preferably a tube, and to which is secured hooks or eyes 2 to support swings or the like. Near each end of the tube are two bolts 3 and 4 which, when the device is erected for use, are at about a 30 degree angle from the horizontal. Pivoted respectively to the bolts 3 and 4 are the tubular supporting legs 5 and 6, the bolts passing through the legs near the upper ends thereof. The surface of each leg contacts the outer surface of the tube below the horizontal axis of the tube, and the legs are crossed at an angle of approximately 60 degrees, as clearly shown in Figure 3.

A bolt 7 is secured to one of the bolts 3 or 4 preferably the former, in any desirable manner. I have shown the bolt 3 passing through an opening in the head of bolt 7, although other types of connections may be used. The bolt 7 is parallel to the wall of the tube 1 and extends beyond the end thereof. A plate 8 is placed against the end of the tube 1 with the bolt 7 passing through an opening 9 in the plate. By tightening a nut 10 on the bolt 7 the plate is securely fastened to the tube.

The plate which is preferably semi-circular at its upper end, is the same width as the diameter of the tube, and extends downwardly to the point where the legs cross. A bolt 11 passes through registering openings in the legs and the plate is fastened by a nut 12, as clearly seen in Figure 4. By this construction the legs are connected to the plate and the plate is secured to the tube and the legs, thus providing a rigid structure. The plate when in place prevents the legs from pivoting, and also, by being fastened to the tube and legs prevents any end sway of the gym set.

If desired a brace 13 may be connected to each pair of legs, as shown in Fig. 2, to provide a more rigid structure. This brace may comprise a piece of pipe flattened at each end as shown, and pivotally secured to one leg at 14, and having a removable pin 15 securing it to the other leg. When the gym set is to be folded the pin 15 is removed and the brace pivoted about the pin 14 so as to lie parallel with the leg 5.

The device may be taken down by removing the bolts 11, at which time the legs may be swung on their respective pivots to a position where they lie parallel to the bar or tube, as may be seen in Figures 1 and 3. Preferably the end plates 8 may also be taken off and laid on the tube so that the whole device can easily be placed in a carton. I have found, in practice, that a tube about two inches in diameter, and legs about one and one-half inches in diameter, are large enough to firmly support the gym set and when folded may be placed in a carton slightly larger than five inches in cross section.

The device may readily be handled by one person and can be set up or taken down by the securing or removal of bolts 11. The bolts 3, 4 and 11 provide a three point securing means for the legs and prevent movement in any direction, yet allow easy assembling or dismantling.

Various slight changes may be made in the arrangement of parts described and hence I do not limit myself to the precise details set forth, but consider myself at liberty to make such changes and alterations as fairly fall within the limit and scope of the appended claims.

What is claimed is:

1. A gym set comprising a hollow tubular bar, pairs of legs connected to said bar at opposite ends thereof, each of said legs being secured to said bar by means of a single bolt extending substantially diametrically across said bar, each of said legs of each of said pairs of legs being mounted adjacent one another at spaced apart points along the length of said bar with the bolts securing the said adjacent legs being spaced apart along the length of said bar and crossing one another so that said legs may be pivoted between a position paralleling said bar to a position in a plane generally perpendicular with respect to said bar, said legs crossing each other in spaced apart parallel planes in said last named position to permit securement of said legs to one another at said crossing point and means connecting said legs of each of said pairs of legs at said point of crossing.

2. A supporting device comprising a hollow tubular bar, pairs of legs connected to said bar at opposite ends thereof, each of said legs being secured to said bar by means of a single bolt extending substantially diametrically across said bar, each of said legs of each of said pairs of legs being mounted adjacent one another at spaced apart points along the length of said bar with the bolts securing the said adjacent legs being spaced apart along the length of said bar and crossing one another, said legs being positioned in spaced apart parallel planes which are generally perpendicular with respect to said bar with said legs crossing one another and bolt means passing through said adjacent legs and connecting said adjacent legs to one another at said point of crossing.

3. A supporting device as recited in claim 1 in which a plate is secured to the open end of said bar by means engaging one of the bolts which extend diametrically across the hollow of said bar, said plate extending from said bar to the crossing points of said adjacent legs and said bolt means securing said adjacent legs to one another at the crossing point thereof extending through said plate to connect said adjacent legs to said plate at the crossing point of said adjacent legs and thereby provide increased resistance to end sway.

References Cited in the file of this patent

UNITED STATES PATENTS

| | | |
|---|---|---|
| 600,100 | Tong | Mar. 1, 1898 |
| 1,706,029 | Knopf | Mar. 19, 1929 |
| 2,651,487 | Loock et al. | Sept. 8, 1953 |